(12) United States Patent
Yang

(10) Patent No.: US 7,821,569 B2
(45) Date of Patent: Oct. 26, 2010

(54) CONVERTER LENS ATTACHMENT WITH BUILT-IN LIGHT SOURCE FOR COMPACT DIGITAL CAMERA

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 145 days.

(21) Appl. No.: 12/360,197

(22) Filed: Jan. 27, 2009

(65) Prior Publication Data
US 2009/0135287 A1 May 28, 2009

Related U.S. Application Data

(63) Continuation-in-part of application No. 11/350,896, filed on Feb. 10, 2006, now abandoned.

(51) Int. Cl.
*H04N 5/225* (2006.01)
(52) U.S. Cl. ...................................... 348/360
(58) Field of Classification Search ......... 348/360–361; 396/529
See application file for complete search history.

(56) References Cited

U.S. PATENT DOCUMENTS

| 6,930,719 | B2 * | 8/2005 | Nakagishi et al. ........... 348/335 |
| 7,724,449 | B2 * | 5/2010 | Takei et al. ................. 359/704 |
| 2003/0035228 | A1 * | 2/2003 | Takanashi ................... 359/819 |
| 2008/0069557 | A1 * | 3/2008 | Ishizawa et al. ............. 396/529 |

* cited by examiner

*Primary Examiner*—Tuan Ho
(74) *Attorney, Agent, or Firm*—Chun-Ming Shih; HDLS IPR Services

(57) ABSTRACT

A converter lens attachment with a built-in light source for macrophotography by a compact camera is disclosed. The converter lens attachment includes a mounting seat, a printed circuit board (PCB) with light emitting diodes (LEDs) parallelly mounted on the mounting seat, an adapter ring accommodating the mounting seat and the PCB, a light diffuser connecting with the PCB, a sleeve being passed through by the light diffuser and leaning against the adapter ring, and a barrel connecting with the sleeve and accommodating the light diffuser. The adapter ring is removably connected to a base body mounted on the camera. There is a battery in the base body for supplying power to the LEDs.

8 Claims, 5 Drawing Sheets

CONVERTER LENS ATTACHMENT WITH BUILT-IN LIGHT SOURCE FOR COMPACT DIGITAL CAMERA

This patent application is a continuation-in-part of U.S. patent application Ser. No. 11/350,896, filed Feb. 10, 2006 now abandoned.

BACKGROUND OF THE INVENTION

1. Field of the Invention

The invention relates digital cameras, particularly to lenses of digital cameras.

2. Description of Related Art

A converter lens can be mounted in front of a non-interchangeable lens of a compact digital camera for providing a magnification greater or less than 1 to the lens. A converter lens is telephoto if the magnification thereof is greater than 1, and is wide-angled if that is less than 1. Some converter lenses whose magnification is greater than 2 are used for macrophotography. Conventional macro converter lenses are unsophisticated lenses without light sources. An external light source for macrophotography must be used. It is expensive and not easy to use.

On the other side, in macrophotography, focusing operation is a spiny question. The depth of field in macrophotography is very shallow. Even a slight vibration can make the shot object out of focus when a tripod is not used to associate with the camera. It would be very helpful if both the shot object and a focus distance of a lens can be unvarying.

SUMMARY OF THE INVENTION

A primary object of the invention is to provide a converter lens attachment for digital cameras, which has a built-in light source for macrophotography. An external light source is not required during performing macrophotography. Thus, macrophotography is easier to be proceeded than ever.

Another object of the invention is to provide a converter lens attachment for digital cameras, which has a specific length for making the focus distance be right at an outer edge of barrel thereof. Thus, the converter lens attachment according to the invention can shoot any planar object by simply placing the converter lens on the planar object.

In order to accomplish the abovementioned objects, the converter lens attachment according to the invention includes a mounting seat, a printed circuit board (PCB) with light emitting diodes (LEDs) parallelly mounted on the mounting seat, an adapter ring accommodating the mounting seat and the PCB, a light diffuser connecting with the PCB, a sleeve being passed through by the light diffuser and leaning against the adapter ring, and a barrel connecting with the sleeve and accommodating the light diffuser. The adapter ring is removably connected to a base body mounted on the camera. There is a battery in the base body for supplying power to the LEDs. The LEDs can emit light to pass through the light diffuser and then to illuminate an interior space of the barrel. The barrel also has a specific length for making the focus distance be right at an outer edge thereof.

DETAILED DESCRIPTION OF PREFERRED EMBODIMENTS

Figure 1:
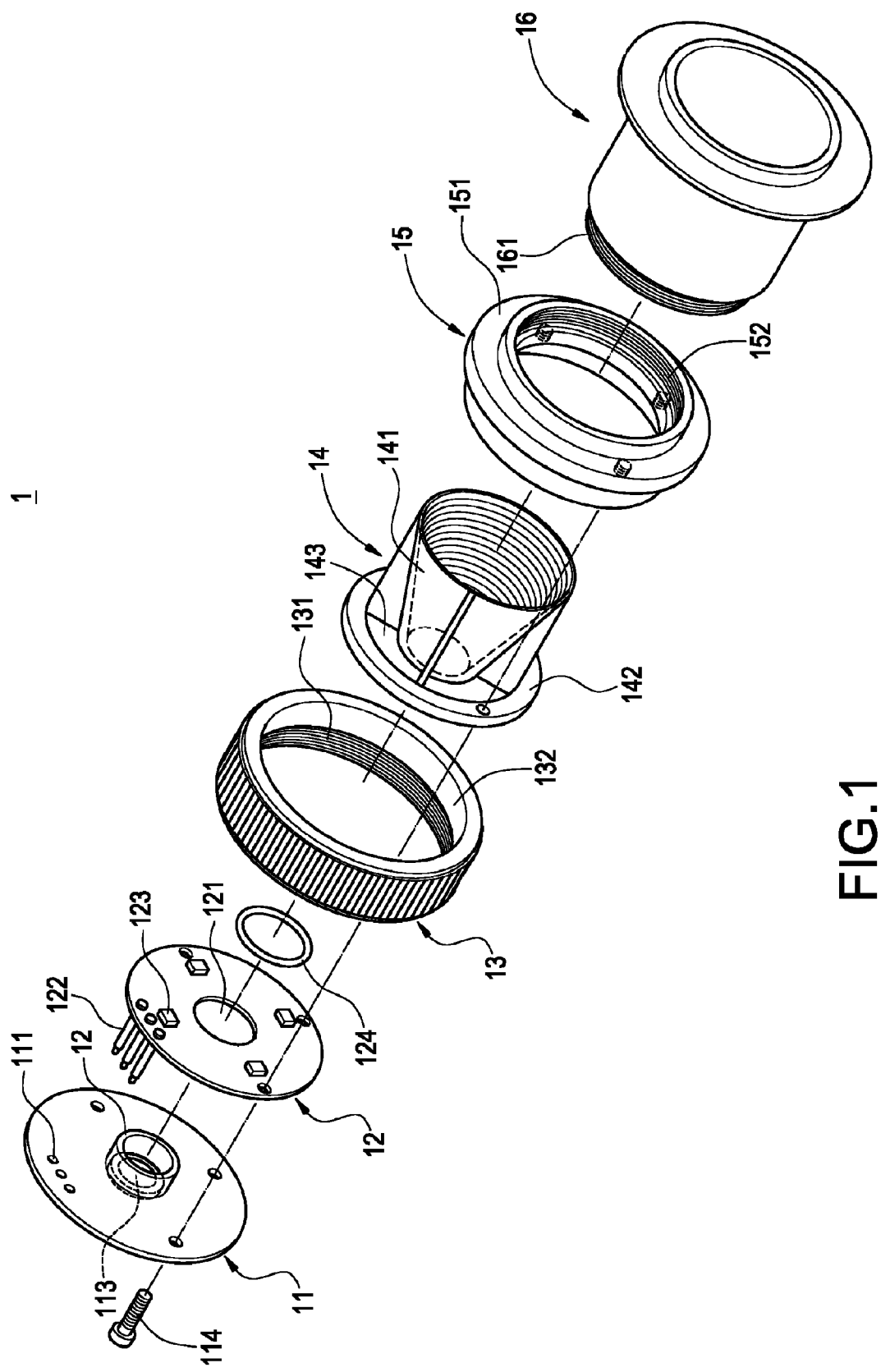
FIG. 1 is an exploded view of the converter lens attachment according to the invention.

FIG. 1 shows an exploded view of a preferred embodiment of the converter lens attachment according to the invention. The converter lens attachment 1 is used for being mounted on a digital camera in front of an original lens thereof.

A mounting seat 11 is a round and hollow disk with a tube 112 at a center thereof. A lens 113 is fixed in the tube 112. There are 3 holes 111 on the mounting seat 11. A round printed circuit board (PCB) 12 with a centered hollow 121 is parallelly mounted on the mounting seat 11 by inserting the tube 112 into the hollow 121. There are four, but not limited to, light emitting diodes (LEDs) 123 on an outward side of the PCB 12. There are three conductive pins 122 on an inward side of the PCB 12. The conductive pins 122 pass through the holes 111 of the mounting seat 11. An O-ring 124 whose outer diameter is larger than inner diameter of the hollow 121 is put around the tube 112 to press upon the PCB 12.

The assembled mounting seat 11 and PCB 12 are rotatably disposed in an adapter ring 13. A plurality of screw rods 114 pass through the mounting seat 11, the PCB 12 and a light diffuser 14, and finally screw to a sleeve 15. The adapter ring 13 has a first inner thread 131 and a smooth surface 132 on inner side thereof. The smooth surface 132 is slightly higher than the first inner thread 131 to form a step. The PCB 12 leans against the step. The light diffuser 14 is made of translucent plastic. The light diffuser 14 is composed of a hollow cone 141 and a mounting ring 142 at a small end of the hollow cone 141 for being passed through by the screw rods 114. There is a gap 143 between the mounting ring 142 and the small end of the hollow cone 141. The LEDs 123 face the gap 143 for emitting light through the hollow cone 141. The sleeve 15 has a surrounding flange 151 and a second inner thread 152 at an outward end thereof. The flange 151 leans against the adapter ring 13. Therefore, assemble of the mounting seat 11, PCB 12, light diffuser 14 and sleeve 15 can be rotatably installed in the adapter ring 13. The second inner thread 152 of the sleeve 15 screwedly connects a barrel 16 having a first outer thread 161 corresponding to the second inner thread 152.

Figure 2:
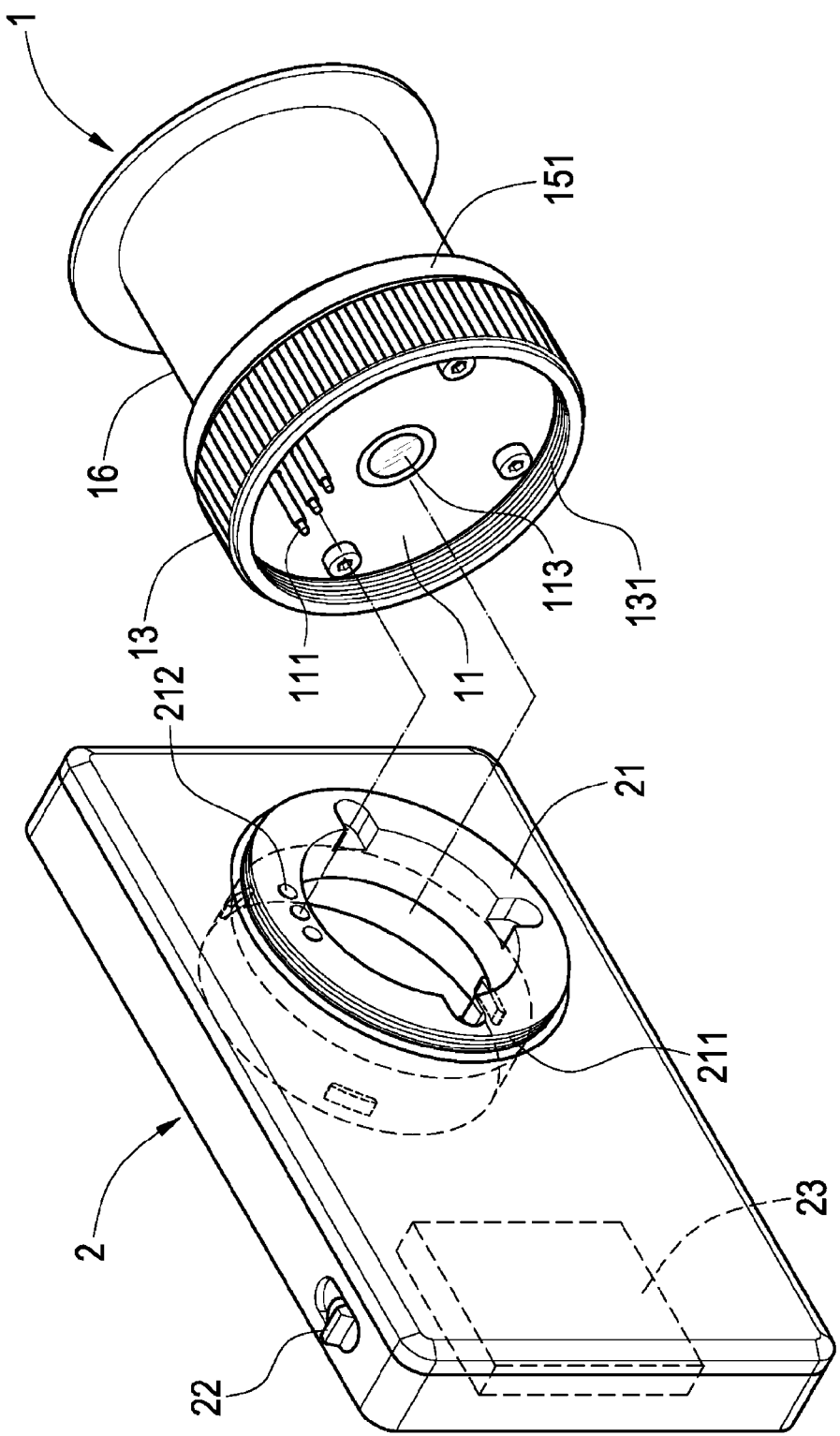
FIG. 2 shows how the converter lens attachment of FIG. 1 is mounted on the base body.

Referring to FIG. 2, the first inner thread 131 of the adapter ring 13 is used for connecting a base body 2. The base body 2 has a hollow and round protrusion 21 with a second outer thread 211 corresponding to the first inner thread 131 for connecting with the adapter ring 13. The protrusion 21 has three cavities 212 corresponding to the conductive pins 122 for being inserted by them. There is a battery 23 in base body 2 for supplying power to the PCB 12 through the conductive pins 122. The base body 2 is provided with a switch 22 for switching on/off the power from the battery to the PCB 12.

Figure 3:
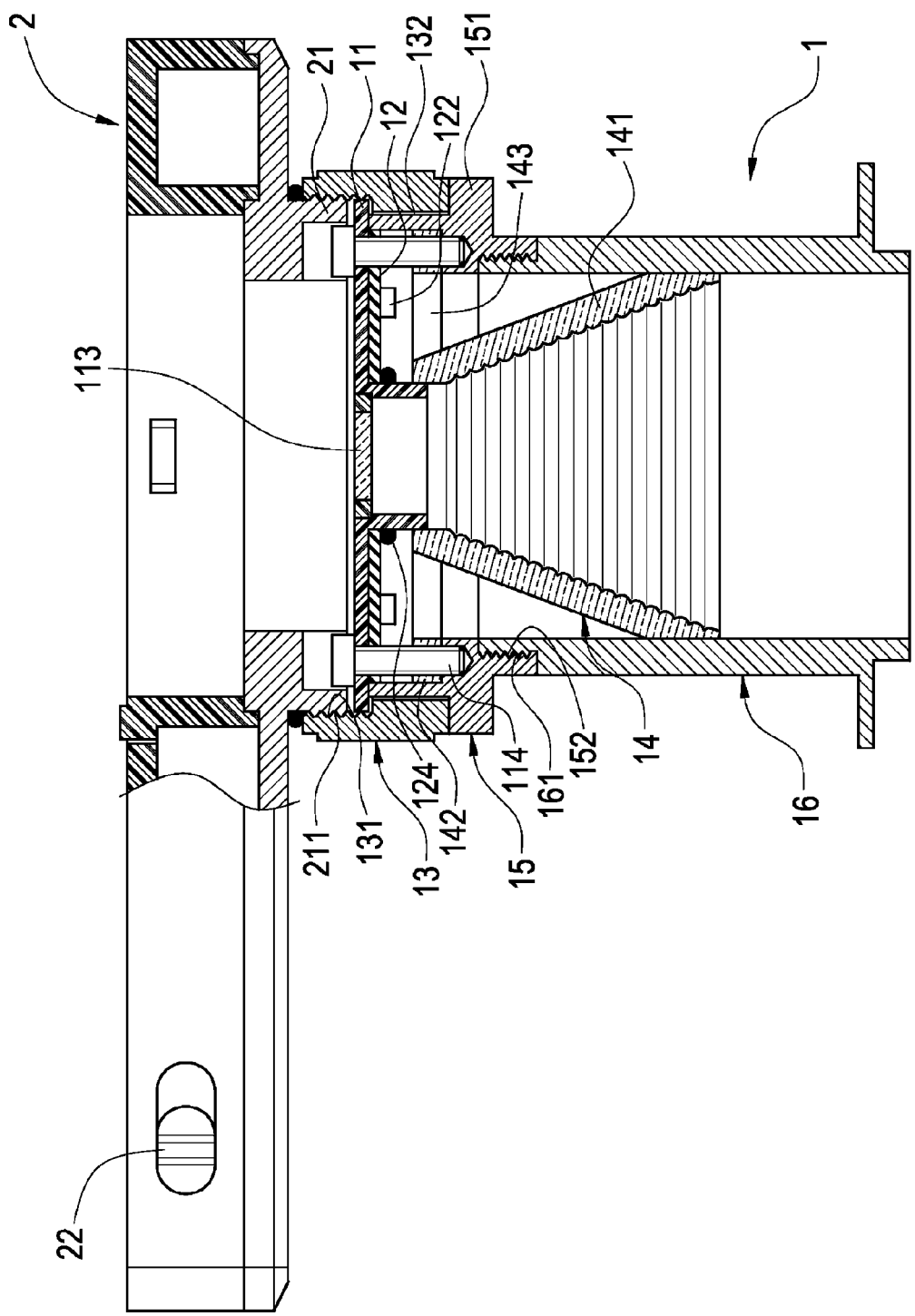
FIG. 3 is a sectional view of the assembly of the converter lens attachment and the base body.

FIG. 3 is a sectional view of an assembly of the converter lens attachment 1 and the base body 2 connected thereto. The LEDs 123 can emit light through the hollow cone 141, and the light passing the hollow cone 141 will be diffused to evenly illuminate an internal space of the barrel 13. The LEDs 123 is powered by the battery installed in the base body 2 and powered on/off by the switch 22.

Figure 4:
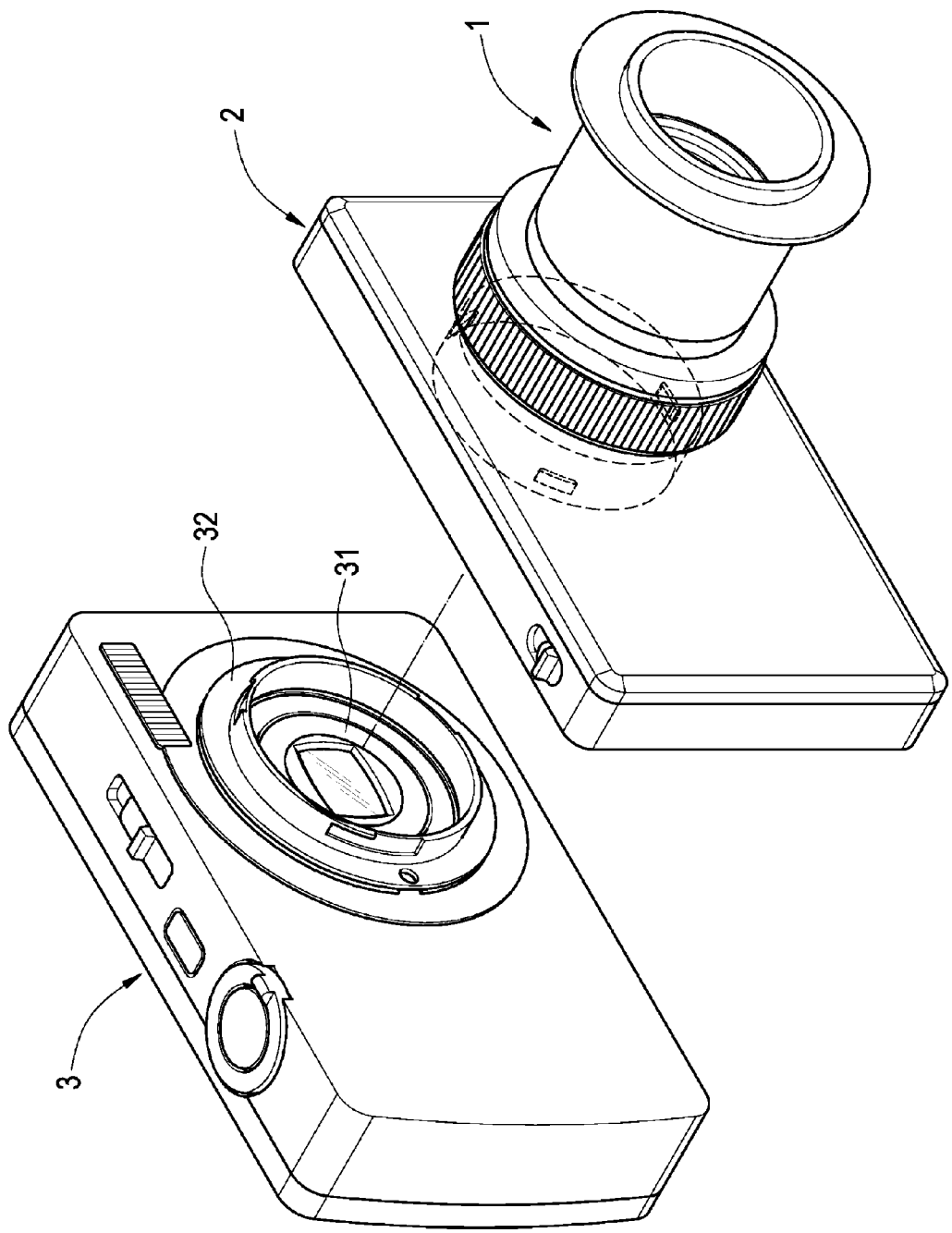
FIG. 4 shows how the assembly of FIG. 3 is mounted on the camera.

Referring to FIG. 4, the base body 2 is mounted on a compact digital camera 3 having a non-interchangeable lens

31. A connecting hoop 32 is fixed around the non-interchangeable lens 31. The base body 2 has a corresponding structure for coupling with the connecting hoop 32 so that the converter lens attachment 1 can be aligned with the non-interchangeable lens 31.

Figure 5:
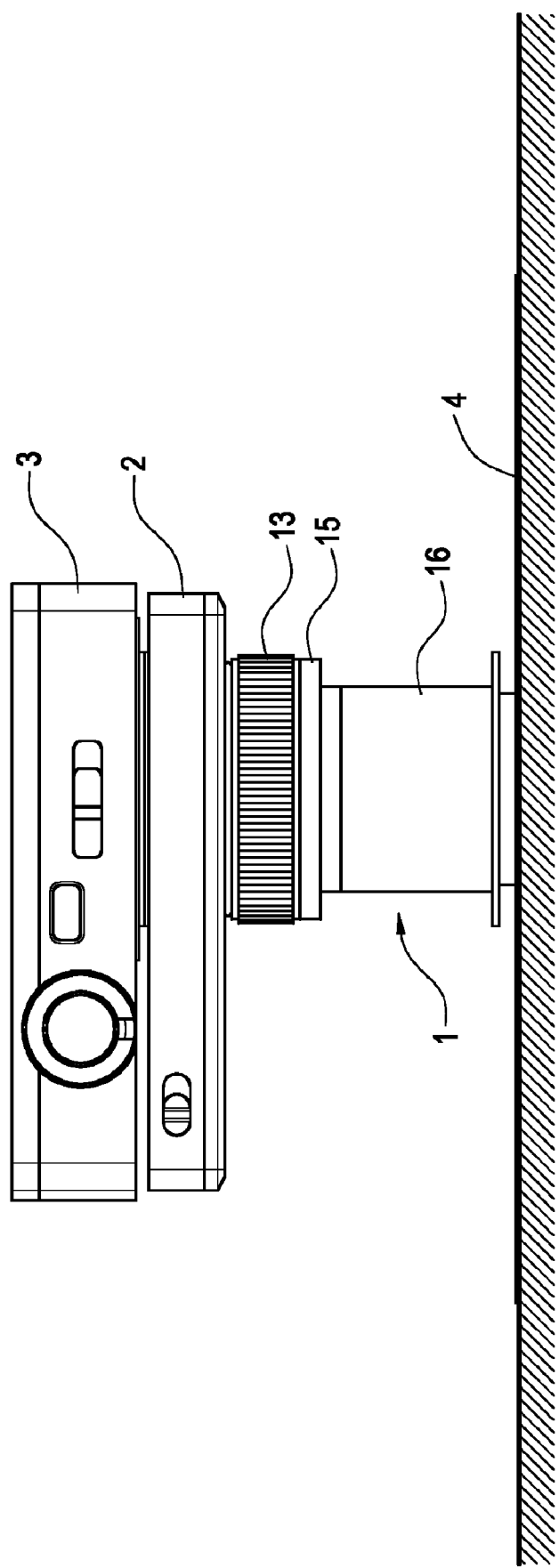
FIG. 5 shows how the camera attaching the converter lens attachment photographs a planar object.

Preferably, the barrel 16 has a specific length matching the optical character of both the non-interchangeable lens 31 and the converter lens attachment 1. Thus, the focus distance is right at an outer edge of the barrel 16. The converter lens attachment 1 can shoot any planar object 4 by simply placing the converter lens attachment 1 on the planar object 4 as shown in FIG. 5. The planar object 4 to be shot can be illuminated by the LEDs 123. The camera 3 with the converter lens attachment 1 can be very stable without vibration because the barrel 16 directly presses the planar object 4.

It is to be understood that the specific embodiment of the invention that have been described is merely illustrative of certain application of the principle of the present invention. Numerous modifications may be made to the structure for converter lens attachment invention described herein without departing from the spirit and scope of the present invention.

What is claimed is:

1. A converter lens attached to an object side of a non-interchangeable lens of a compact digital camera, comprising:
    a mounting seat being a disk with a hollow portion and having a plurality of holes thereon;
    a lens embedded in the hollow portion of the mounting seat;
    a printed circuit board (PCB) with a centered hollow corresponding to the lens, parallelly mounted on the mounting seat, having a plurality of light emitting diodes (LEDs) on one side of the PCB, and having a plurality of conductive pins on an another side of the PCB, wherein the conductive pins pass through the holes of the mounting seat;
    an adapter ring accommodating the mounting seat and the PCB;
    a light diffuser made of translucent plastic, composed of a hollow cone and a mounting ring at a small end thereof, a gap being remained between the mounting ring and the small end of the hollow cone, and the mounting ring being accommodated in the adapter ring to connect with the PCB, wherein the LEDs face the gap for emitting light through the hollow cone;
    a sleeve having a surrounding flange for leaning against the adapter ring, and passed through by the hollow cone, wherein the mounting seat, the PCB, the light diffuser and the sleeve are fixed together by one or more fastening elements;
    a barrel axially connected to the sleeve for entirely accommodating the hollow cone; and
    a base body removably connecting with the adapter ring, having a plurality of cavities for being inserted by the conductive pins, having a battery therein for supplying power to the PCB through the conductive pins, and having a switch thereon for switching on/off power from the battery to the PCB;
    thereby the base body is removably mounted on the camera.

2. The converter lens as in claim 1, wherein mounting seat has a tube at a center thereof, and the lens is surrounded by the tube.

3. The converter lens as in claim 2, wherein the PCB is mounted on the mounting seat by inserting the tube into the centered hollow of the PCB.

4. The converter lens as in claim 3, further comprising an O-ring, whose outer diameter is larger than inner diameter of the centered hollow of the PCB, is put around the tube to press upon the PCB.

5. The converter lens as in claim 1, wherein the adapter ring has a first inner thread and a smooth surface on inner side thereof, the smooth surface is higher than the first inner thread to form a step being leaned against by the PCB.

6. The lens converter as in claim 1, wherein the sleeve has a second inner thread at an outward end thereof, and the barrel has a first outer thread for screwedly connecting the second inner thread.

7. The lens converter as in claim 1, wherein the base body has a hollow protrusion for connecting with the adapter ring.

8. The lens converter as in claim 5, wherein the base body has a hollow protrusion with a second outer thread for connecting with the first inner thread of the adapter ring.

* * * * *